(12) United States Patent
Lambert et al.

(10) Patent No.: US 7,831,790 B2
(45) Date of Patent: Nov. 9, 2010

(54) UNIVERSAL MEMORY DEVICE HAVING A PROFILE STORAGE UNIT

(75) Inventors: Nicolaas Lambert, Eindhoven (NL); Adrianus Johannes Maria Denissen, Eindhoven (NL); Wilhelmus Franciscus Johannes Fontijn, Eindhoven (NL); Robert Jochemsen, Eindhoven (NL)

(73) Assignee: NXP B.V., Eindhoven (NL)

( * ) Notice: Subject to any disclaimer, the term of this patent is extended or adjusted under 35 U.S.C. 154(b) by 1127 days.

(21) Appl. No.: 10/549,367

(22) PCT Filed: Mar. 17, 2004

(86) PCT No.: PCT/IB2004/050269
§ 371 (c)(1),
(2), (4) Date: Sep. 14, 2005

(87) PCT Pub. No.: WO2004/084231
PCT Pub. Date: Sep. 30, 2004

(65) Prior Publication Data
US 2006/0174056 A1      Aug. 3, 2006

(30) Foreign Application Priority Data
Mar. 19, 2003 (EP) .................................. 03100715

(51) Int. Cl.
*G06F 13/10*  (2006.01)
(52) U.S. Cl. .................................................... 711/163
(58) Field of Classification Search ........................ None
See application file for complete search history.

(56) References Cited

U.S. PATENT DOCUMENTS

| | | | |
|---|---|---|---|
| 5,375,089 A | 12/1994 | Lo | |
| 5,717,646 A | 2/1998 | Kyi | |
| 5,930,826 A | 7/1999 | Lee et al. | |
| 5,974,500 A | 10/1999 | Maletsky et al. | |
| 6,381,671 B1 | 4/2002 | Ayukawa et al. | |
| 6,795,327 B2* | 9/2004 | Deng et al. | 365/63 |
| 7,318,129 B1* | 1/2008 | Falik et al. | 711/152 |
| 2001/0015905 A1* | 8/2001 | Kim et al. | 365/51 |

(Continued)

FOREIGN PATENT DOCUMENTS

CN       1112717       11/1995

OTHER PUBLICATIONS

Communication pursuant to Article 94(3) EPC, Office action from European Patent Office, mailed Oct. 10, 2008.

*Primary Examiner*—Tuan V Thai
*Assistant Examiner*—Duc T Doan (57) ABSTRACT

A universal memory device is presented that provides adaptability to existing hardware and software environments. The memory can "mimic" existing memory technology combining the advantages of integrating all memory capacity into one single technology and still providing the implicit protections and access characteristics known from the different existing memory technologies. The memory device comprises a memory having low-latency, rewritable, non-volatile memory cells, a profile storage unit connected with the memory and comprising access information allocated to a set of request information elements (request profile), such that the access information indicates whether an access request to said memory, the access request having the request profile, is to be allowed or rejected, and an access control unit communicating with the profile storage unit and the memory, and adapted to allow or reject an incoming access request in dependence on the access information allocated to the request profile of the access request.

6 Claims, 3 Drawing Sheets

U.S. PATENT DOCUMENTS

2002/0002654 A1   1/2002  Tomohiro
2004/0054864 A1*  3/2004  Jameson ..................... 711/167
2004/0088513 A1*  5/2004  Biessener et al. ........... 711/173

* cited by examiner

UNIVERSAL MEMORY DEVICE HAVING A PROFILE STORAGE UNIT

The invention relates to a memory device with low-latency, non-volatile, rewritable memory cells, and, in particular, to a universal memory device.

Current digital systems typically employ a multitude of different memories. For processing, caching and buffering, Static Random Access Memory (SRAM) and Dynamic Random Access Memory (DRAM) are used. For executable code, on the other hand, Read-Only Memory (ROM), Erasable and Electronically Erasable Programmable ROM (EPROM, EEPROM), and NOR-Flash are employed. Finally, for persistent data storage, one uses NOR-Flash, NAND-Flash and magnetic or optical disc drives.

The choice of the type of memory is dictated by criteria like performance, cost, persistence of stored information after power down, or the ability to rewrite the memory. Often one or more of the mentioned technologies are combined into a single package or even in a single chip in an attempt to overcome disadvantages of a particular technology, or to simplify overall system design.

New memory technologies have been developed in an attempt to combine attractive properties of several of the above-mentioned types of memory in one technology. For instance, Magnetic Random Access Memory (MRAM), Ferroelectric RAM (FERAM), Ovonics Unified Memory (OUM), and to some extent also battery-backed SRAM as well as battery-backed slow-refresh SDRAM share the advantage of combining a rewritable and non-volatile memory space with a low latency. This advance in technology triggered attempts to also merge in a single memory device different memory uses like caching, persistent data storage, and other types of the uses mentioned in the beginning, that have been performed by different memory devices to date. The concept of merging different memory uses in a single memory device with low-latency, non-volatile, rewritable memory cells is also referred to as universal memory. Universal memory is anticipated to lead to a simpler computer design, lower power consumption, and lower inventory cost.

However, current hardware (HW) and software (SW) architectures implicitly rely on the properties of the different, still prevailing memory technologies for proper functioning. This will be explained in the following by way of several examples.

As a first example, the current software design of operating systems for computers builds on a property of current typical processing memory, namely, its volatility. Due to the volatility of the processing memory, operating systems of computers provide a re-initialization of the processing memory at power-up. As a consequence of this, since re-initialization is performed anyway, there are no provisions necessary against spurious write operations to the memory during power-down and power-up of the computer. These spurious writes destroy processing code that has been loaded previously to the memory and is necessary for normal operation.

In contrast to processing memory, persistent memory for storage of data and code, as a second example, typically has explicit or implicit protections against spurious overwrites during power transitions. Explicit and implicit protections of a memory against write operations are inherent in a respective memory technology. E.g., the protection of a ROM device against an overwriting of stored data and code is due to the physical nature of the storage medium and the technique used for write and read operations. Hence, crucial start-up code of a computer system is stored in a ROM to protect it against getting corrupted during operation. Furthermore, dedicated hardware protections may be provided, for instance, by providing a memory device with an electrical contact enabling a write operation and making this contact accessible only in the manufacturing process for programming the memory device. In addition, or alternatively, data stored in persistent memory is often hidden in a relatively complicated and/or slow write protocol. A write operation to a memory is only enabled if the write protocol is used, thus preventing unintended write operations.

Another example for a typical feature of memory devices, that current software and hardware design relies on, is that some memory devices allow Direct Memory Access (DMA) for peripheral hardware. DMA provides an access to the memory independent from the control of a Memory Management Unit (MMU) in the central processing unit (CPU) of a computer. The DMA hardware is a specialized processor, e.g., in a controller of an I/O device. It transfers data between the memory and the I/O device without using processing and register capacity of the CPU.

In addition to the implications of existing memory technologies mentioned, different types of memories may be addressed in different ways. For example, memory related to processing and execution typically uses a low-latency, random addressable memory-mapped addressing scheme on the processor. Data storage, however, typically uses I/O addressing in data blocks. This implies a higher latency, but gives a large data capacity while requiring a relatively small processor address range. I/O addressing also has good data streaming properties.

These examples of the implications of the memory technology prevailing to date show that a transition to the sole use of the so called universal memory instead of the various types of memory used today requires an adaptation of the hardware design of computers as well as of the software design. Thus, while almost ready to enter the market, and despite of a high potential to merge the plurality of present memory technologies into the use of one single technology, universal memory is hard to implement into present hardware and software systems.

It is therefore an object of the present invention to provide a universal memory device that fits into the present hardware and software environment.

According to the invention a memory device is provided comprising a) a memory having a plurality of low-latency, rewritable, non-volatile memory cells forming at least one memory section, b) a profile storage unit connected with said memory and comprising access information allocated to at least one set of request information elements (hereinafter request profile), such that said access information indicates whether a request for access to said memory (hereinafter access request), said access request having said request profile, is to be allowed or rejected, c) an access control unit communicating with said profile storage unit and said memory, and adapted to allow or reject an incoming access request in dependence on the access information allocated to the request profile of the access request.

The basic idea of the present invention is that many applications use implicit properties of a certain type of conventional memory. For example an implicit property of volatile RAM is that all data is lost if the device is switched off. This property is used implicitly as a security measure. The memory device of the invention builds on the new universal memory technology, providing low-latency, rewritable, non-volatile memory capacity, and is adapted or has the ability to adapt to hardware and software environments designed for conventional memory technologies.

The memory device of the invention provides adaptability to different hardware and software architectures by differentiating between a plurality of request profiles. Before showing how adaptability can be achieved this way, the term request profile as used herein is explained.

A request profile comprises a set of request information elements. Request information is, generally speaking, all information related to an access request, indicating for instance the source of the request, i.e., a memory client, the memory section the request is directed to (address information), the type of memory access requested (read and/or write), and other information related to the request. Such other information is for instance the time of the request, or a security class information transmitted with the request, indicating an authorization to access a certain memory section. Request information on a particular aspect of an access request is called a request information element. A request information element may comprise one or more bits of information. Further examples of request information elements will be given below and in the context of the description of preferred embodiments of the invention.

It is important to note that request information is on one hand information comprised by the request, such as the memory section access is requested to. However, request information is not limited to information of this kind. Request information is on the other hand also information that is related to the request, but not comprised in the received request data, be it command-related data or user data of the request. Request information of the latter kind, if comprised by a request profile, is ascertained in an indirect way from the access request. Examples for request information of this latter type are the time of the request, and the information whether an access request directed to the same memory section has been received by the memory device before within a defined time span.

A request profile, therefore, can take the form of a data structure, such as a list comprising one or more entries representing request information. A set of request profiles can be represented by a table, in which each request profile takes, e.g., one line. Each column of the table represents one request information element, such as information elements "write request", yes or no, "read request", yes or no, "memory client identification", given by an identification code. In general, an entry in a line of the table, i.e., an information element of a request profile, can take the form of a code indicating "yes", "no", or specific data such as a memory client identification number, a password, etc. Obviously, different request profiles can differ in the number of specified request information elements. If the set of request profiles served by the memory device of the invention is structured as a matrix, a code indicating "not specified" may be used for certain information elements, for instance if providing a password with a request is not necessary in a specific request profile.

There is no need to stick to a software structure of request profiles. A request profile can also be implemented by hardware. For instance, consider request information elements indicating the memory address an access request is directed to. A memory address is typically communicated in the form of address bits. Each possible combination of address bits can represent an individual request profile. Such combination of address bits can be allocated to access information by a circuit providing a programmable switching element (access flag) for each possible combination of address bits. The access flag allows or rejects an access request to the memory section corresponding to the combination of address bits that is contained in the request. This way, in principle, access to each individual memory cell can be controlled. Of course, groups of addresses allocated to the same access flag can be defined this way, too. In a similar way as address information, every other combination of request information elements can be allocated to a respective access flag.

It is noted that the functionality of the memory device of the invention does not rely on a specific data structure of a request profile. For example, the request profile can comprise an access information element in addition to request information elements, indicating whether a request comprising the request information elements of the particular request profile is to be admitted or rejected.

A further important element of the memory device of the invention is the access control unit. The access control unit ascertains an appropriate request profile to an incoming request using the request information of that request. Based on the request profile ascertained, the access control unit allows or rejects the requested memory access.

The memory device of the invention has a memory with low-latency, rewritable, non-volatile memory cells. Thus, as known per se for universal memory devices, it combines the advantages of different older memory technologies with a high degree of flexibility in the use of the memory. The memory may be based on any of the previously mentioned universal-memory technologies, which per se all are well known in the art, or a combination thereof. The invention is not restricted to the use of these memory technologies, as further technologies providing low-latency, rewritable, and non-volatile memory may emerge in the field. The term "low latency" serves to characterize the types of memories mentioned in the beginning, differentiating the memory device of the present invention also from magnetic hard-disk storage technology with a high latency in the ms range. Generally, the lower the latency, the more flexibility of use the memory device of the invention offers. For if necessary, the access control unit, as described in the context of a preferred embodiment, can always provide a higher latency.

As all memory devices, the memory device of the invention is adapted to receive access requests from at least one external memory client. An access request is any request for access to the memory device, be it to working data, user information or code stored in the memory, access profile information or program code used by the memory device, or to other information stored in the memory device. Among the access requests are, beside read requests and write requests, further types of access requests such as, for instance, a "Clear" command. A "Clear" command is a request to deallocate a memory section such that it is allowed to be overwritten.

Most access requests specify a memory section they ask access to. The term "memory section" comprises, by way of example, a specific memory cell, a memory row, a memory column, a memory block, or any group of memory cells, rows or columns or blocks, up to the whole memory. Thus, an access request may be directed to any cell or group of cells in the memory of the memory device of the invention.

In summary, the universal memory of the invention is adapted to be programmed to have a plurality of different access characteristics in accordance with a specific hardware and software environment. The access characteristics to the memory device of the invention can be made different for different memory clients and/or for different memory sections by defining corresponding request profiles. Based on request profiles different requests are identified and served or rejected in accordance with the respective access characteristics. The universal memory of the invention is therefore adapted to be used in existing hardware and software environments that build on a multitude of memory types.

The memory device of the invention can be implemented in different embodiments.

Preferably, in the memory device of the invention, the request information comprises information indicating a type of request, an external memory client from which the request originates, a memory section the request is directed to, an access authorization, a password, a request protocol type, a time of request, an interface receiving the request, the length of the request, a time span lapsed since the last request, a security class, or a priority class.

Information about the length of the request is available in many standard request protocols. It can be used, alone or in conjunction with time information, to create a form of an access bandwidth restriction. With the aid of security class information that is either contained in a request or can be deduced from other request information such as the memory client originating the request, write and/or read access can be restricted to certain memory sections while allowed to others. With the aid of priority class information a feature can be realized in which from a number of pending requests the request with the highest priority class is served first. This way, the performance of applications can be enhanced.

When different memory uses known from earlier memory technologies are combined in a single device, it becomes crucial to provide the corresponding different memory properties and protections inherent in these technologies. A preferred embodiment of the memory device of the invention comprises a plurality of interfaces for communication of the memory device with different external memory clients or for communication according to different memory uses, each interface being connected with the access control unit and allocated to a subset of request profiles.

The interfaces are functional units each providing specific access characteristics by allocating access information to a subset of the set of request profiles reflecting a specific memory use and/or communication rules shared with a specific external memory client. The interfaces can be provided in the form of hardware or software. Also, some software-differentiated interfaces and some hardware-differentiated interfaces may be present. In order to keep the advantages of a lower bill of materials, more flexibility and lower inventory cost, it is advantageous to be able to combine different memory uses in a single memory structure in a programmable rather than a hardwired way. Hardware programmability provides the required flexibility while being a more robust solution than purely software based solutions. Beside the term "interface", the term "port" will be used herein with the same meaning.

The ports can be hardware and/or software differentiated. A port preferably corresponds to a particular memory usage and mimics a conventional memory technology. This combines the advantages of various protections and properties of conventional memory technologies as mentioned above with the advantages of being compatible with legacy solutions. The address ranges of the various ports may or may not overlap.

As a first example of the present embodiment, a specific interface "A" is allocated to read and write requests originating from one specific memory client "B" that has access rights to only a defined section "C" of the memory. Any read or write request from memory client B is allocated to interface A which will provide the requested access to memory section C.

As a second example, a specific port "D" is allocated to requests directed to a specific memory section "E". The memory device mimics a Read-Only memory in Section E. Thus, requests directed from any external memory client to memory section E are allocated to port D, which will provide a read access only. If the request is a write request, the request is rejected at port D by the access control unit.

The ports of the present embodiment are preferably adapted to provide memory access characteristics needed in a given hardware and software architecture, for instance that of a Read-Only Memory, of a DRAM memory, or of a Password-Protected Memory.

By way of defining adequate request profiles and allocated access information the following access characteristics can be provided:

a) Write once, afterwards read access only. This makes it possible to store protected and/or tamper-free code and data. It provides the equivalent of ROM, PROM, OTP, WORM and EPROM that can typically not be rewritten inside the embedded system. This could be implemented as a write lock flag (or a flag that freezes the current protection settings) that can only be set, but not cleared. But also as a write protect flag that can only be cleared under special circumstances.

Any irreversible lock mechanism in the access can be provided by special measures during manufacturing and testing, to prevent that the device might effectively become unusable when the lock is accidentally triggered in normal operation. This can be solved by initialization of the device through a special pad, or another special condition like a strong external magnetic field in the case of an MRAM memory.

b) "Difficult to write, easy to read". Flash and EEPROM can often be rewritten inside an embedded system through very special measures, but their "write-protect" behavior is sometimes still implicitly used by the system. This could be implemented as a programmable write protect flag. An actual write operation would have to include removing the write-flag, the write operation itself, and setting the write protect flag again. An accidental write would be blocked by the write protect flag.

c) Power-on reset clears the content of a certain memory segment during power-on. DRAM and SRAM loose their content on power-down. This is sometimes used implicitly as a security/privacy feature: no traces left after powering down. Note that an explicit user-initiated memory clear before power-down may also be possible, but that is not the same. Also note that an automatic memory clear of indicated memory segments during power-down may seem to be safer than a clear at power-on reset, but may be difficult to implement reliably in an uncontrolled power failure.

d) A read-once property may be a useful feature for some pay-per-view and for-your-eyes-only schemes. In a standard random access memory this property may be too hard to implement in a useful way, but for block-access or a paged device it is easily done.

e) Write-only memory in a certain segment. Making an "easy to write, but difficult to read" segment may help in certain tracking or security/privacy schemes like password-storage.

f) No-access to a certain segment can be useful, e.g., to expose only one certification code to the rest of the system, and only resort to the next stored alternative when the previous one expires or is revoked. Another application is when the access restriction depends on the port. In that case it can be useful to define a certain segment as forbidden territory for one port, and fully accessible for another, or to define a message passing window with write-only access for one port and read-only access for another port.

g) Password protected access restrictions to (parts of) the memory may e.g. be useful in Digital Right Management, but also in support of the above modes. These characteristics can e.g. be described by a number of flags or codes.

The memory device of the invention differs from known processor based Memory Management Units (MMU) in that access restrictions governed by a MMU are independent of the memory itself. The memory module administrated by an MMU can be sold separately, or removed from the system and used in a different system. In addition a MMU cannot force access restrictions for other DMA hardware in the system, and cannot handle all of the mentioned access characteristics.

In a further embodiment the access control unit of the memory device of the present invention takes the form of a distributed access control function that is implemented in the interfaces. In this embodiment, there is no need for a central access control unit in the memory device. The functionality of the access control unit is distributed over the interfaces. Each interface is responsible for allocating an incoming request to one request profile of the subset of request profiles served by the particular interface, and for allowing or rejecting the access request in dependence on the allocated request profile.

Preferably, one of the interfaces of the memory device of the present embodiment is an SRAM-type interface, i.e., a so-called memory-mapped interface. It is adapted to serve separate connections for address data input and user data exchange, respectively, between the memory device and at least one external memory client. In this embodiment, the memory-mapped interface receives an access request through two separate input connections. Through a first connection it receives memory address information comprised by the request. Through a second connection it receives or sends user data. The connections are preferably established through different pins of the memory device, a pin for each bit in the address, and a pin for each bit in the data word. A memory-mapped interface has the advantage that it provides random access to memory data with very low latency. As to request profiles for a memory-mapped interface, access requests directed to the memory-mapped interface may be differentiated by request information elements indicating enabling signal levels at one or more address pins of the memory device.

In another embodiment, the memory device comprises an I/O-mapped interface. In this embodiment, the I/O mapped interface receives address information and user data through only one connection. The interface is adapted to serve a shared connection for address data input and user data exchange between the memory device and at least one external memory client. To separate address information from user data, a separate control connection may be used, for instance through a separate pin in the form of an AddressEnable pin. To signal that subsequent data received at the interface is address data, the signal level at the AddressEnable pin is set to a "high" level. This information may also be used as distinguishing request information for request profiles allocated to the I/O-mapped interface. An I/O-mapped interface has the advantage to save pins. On the other hand, random access to the memory is slower than for the memory-mapped interface type. The I/O-mapped interface may be used for instance to let the memory device of the invention provide the functionality of a NAND flash memory.

It is within the scope of the invention to provide compatibility to any known technology used for memory addressing, among which memory mapped addressing and I/O addressing are the most prominent and widely used methods.

In a further embodiment both a memory-mapped interface and an I/O-mapped interface are provided. Both interfaces may provide access to the same memory address range, to completely separate memory address ranges, or to overlapping memory address ranges. This is, by the way, a general advantage of the memory device of the invention that is not restricted to the example of memory-mapped and I/O-mapped interfaces. The pins of the memory device that serve for exchange of user data with external memory clients are preferably shared by the I/O-mapped and the memory-mapped interfaces.

Memory-mapped and I/O-mapped interfaces are two widely used examples of interfaces that the memory device of the invention is able to provide with the aid of request profiles. The memory device of the invention can similarly provide any other interface types known in the art, alone or in parallel.

The access characteristics of the memory device are in a further embodiment of the invention programmable for each port. In another embodiment the access characteristics are programmable for each memory block, e.g. of 4 KBytes size.

In a further embodiment of the memory device a translation unit is provided. The translation unit is adapted to translate between one or more different ways of memory addressing, such as memory mapped vs. I/O mapped. The translation unit allows providing access to the same or two overlapping memory sections for memory clients using different memory addressing types. Only one interface serving one type of memory addressing is necessary when the translation unit is present. The compatibility may be provided by a programmable address translator included in the interface unit.

The translation unit in an alternative embodiment preferably integrated upstream of the interface unit. It may also be implemented as an external unit. This way, the number of pins of the memory device can be reduced.

Flexibility can be provided by programmable access characteristics for each port (e.g. write protection), and a programmable address range in the memory structure. The programmability of the access characteristics can be achieved through a separate bus command, or a special memory section.

In a further preferred embodiment of the invention a supervisor interface is provided which is adapted to create or change at least one request profile and/or access information allocated thereto, given a predetermined condition. Manipulation of access characteristics is performed by changing the request profiles concerned and/or access information allocated to these request profiles. Creation of a new request profile is preferably accomplished by creating a new line entry in the request profile matrix described earlier, specifying request information elements that distinguish the new request profile from the ones already existing. The change of an existing request profile is accomplished by adding or deleting a request information element, or by changing the specific value or code of that request information element in the selected request profile. For example, it is useful when the memory device can trade-off execution code space versus user data storage space. To accomplish this, the respective address ranges for storage of execution code and user data defined in the concerned request profiles are changed so that, for example, a request to write user data to the memory will also be allowed if directed to a memory section that was before used for execution code.

Access restrictions to the access changes could simply be the result of the programmable access scheme, where the system simply restricts further access to access programming to only one of the ports. External access is preferably restricted to only the supervisor interface. The supervisor interface can provide defined change authorization to external memory clients by appropriate request profiles. In this embodiment the supervisor interface is adapted to admit or reject external requests for change of a request profile or access information, depending on the request information of the access request from an external client. In addition or as an alternative, a password protection scheme for changes to the access properties can be considered.

Access information is typically a one-bit information element indicating admission or rejection. A change of the access information allocated to a request profile simply implies switching the respective information element. An example for the use of the change of access information is the change of code in the memory that is write-protected initially. Write protection is lifted for the programming access to the code and then reinstated.

However, the authorization to change the request profile or an access information allocated to a request profile must be limited, since such change touches core functionalities of the memory device and the connected hardware relying on the data in the memory. In a further embodiment, therefore, the supervisor interface is adapted to admit or reject external requests for change of a request profile, depending on access information allocated to at least one predetermined change request profile. Special request profiles may be implemented serving to define the memory clients and/or circumstances that may cause a change a certain group of request profiles or access information. For example, such programming access can be password protected. Programming access can be restricted to certain request information elements, to certain time spans, or to certain events. As an example for an event-triggered change, a change of access information may be caused by the event of having served a first write access request to a memory section defined in the corresponding request profile.

In a further preferred embodiment of the invention, said profile storage unit takes the form of a set of access flags, each access flag allocated to a respective interface, and wherein said access information is given by one of two possible states of an access flag.

In a further embodiment of the memory device of the invention, access information takes the form of one of two possible states of an access flag. In this embodiment, the profile storage unit preferably comprises a set of access flags, each access flag allocated to a respective request profile.

The profile storage unit is in a further embodiment integrated into said access control unit. In an alternative embodiment, it is an integral part of the memory. In a further embodiment the access control unit is adapted to maintain a current copy of said access storage unit in a predetermined section of the memory.

In a further embodiment the memory device of the invention is adapted to provide programmable access characteristics per programmable windows. That means, not only the access flags may be programmed through the address and data interface, but also the address range of the memory cell array that specific access characteristics are valid for.

The access characteristics can be programmed as an access type per memory block (e.g. of 4 KBytes), and/or per port. E.g., each memory block of say 4 KByte could have programmable access flags. Or each memory block could have programmable access flags separately for each port. Or, as mentioned above, each port could have programmable access flags and a programmable window.

In many cases it is important that the access configuration is stored in non-volatile memory. This can be important for proper system operation, but also for a business model where a single "universal memory devices" can be permanently programmed by the manufacturer or supplier as drop-in replacement for different existing combo-devices with hard-wired partitioning between different memory types. (Somewhat comparable to the practice of "down-stroking" in Hard Disk Drive business.)

In the following, the invention will be described in further detail based on preferred embodiments with reference to the figures, wherein.

Figure 1:
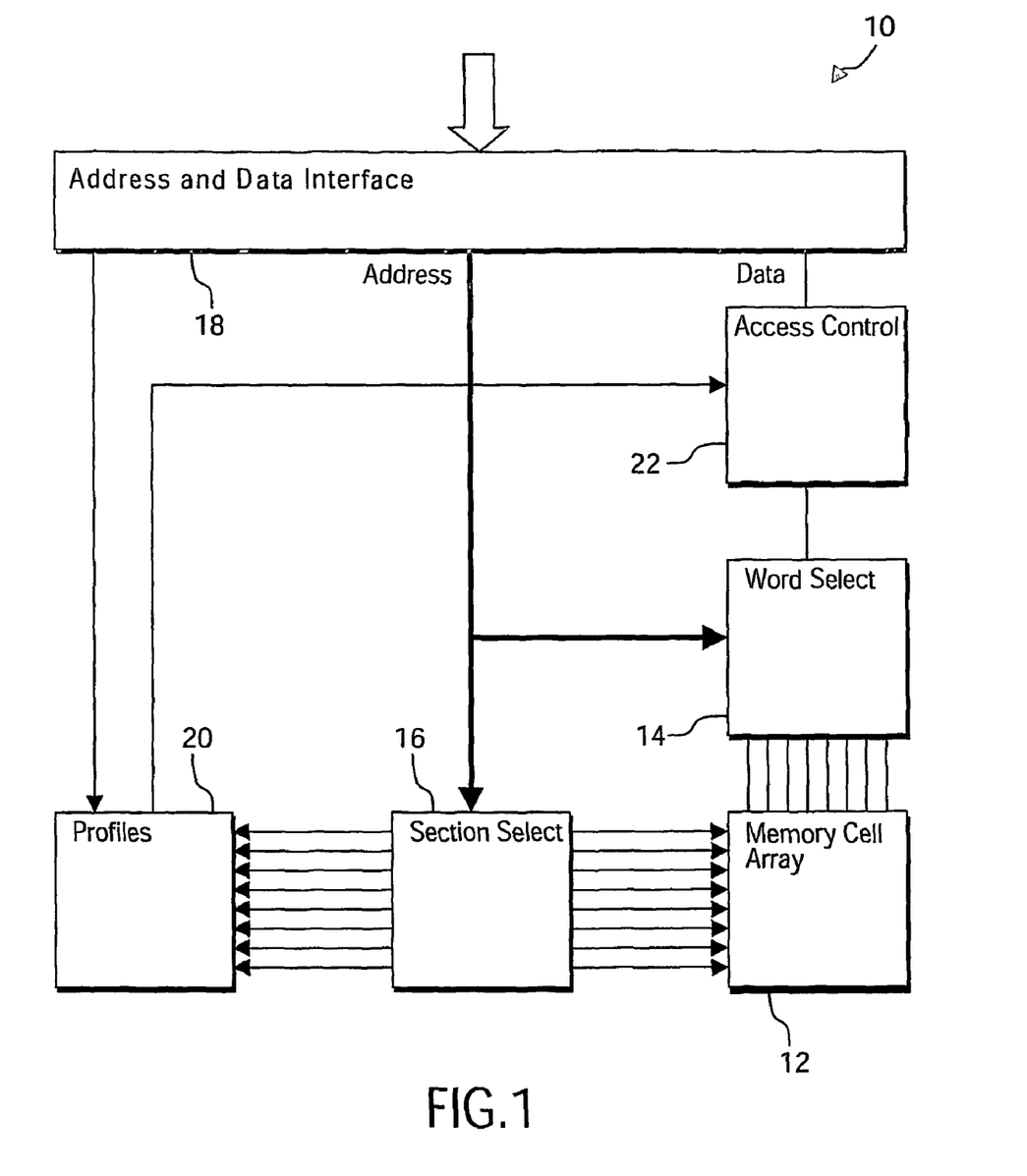
FIG. 1 is a simplified block diagram of a first embodiment of a memory device according to the invention.

FIG. 1 shows in a simplified block diagram as a first preferred embodiment a memory device 10 according to the invention. The memory device has a memory cell array 12 of magnetic RAM cells. The memory cell array 12 is connected to a word-select unit 14 and a section-select unit 16. Word-select unit 14 and section-select unit 16 are connected to an address and data interface. Address and data interface 18 is further connected to a profile storage unit 20 and an access control unit 22. Address and data interface 18 is an interface of memory device 10 to external memory clients.

Word-select unit 14 and section-select 16 operate to select the part of the memory that is accessed by an access request. In the present embodiment, Word-select unit 14 provides a column selection mechanism that mostly operates in the data path. Section select unit performs a row selection mechanism that only controls the memory array, i.e., is not in the data path. Both units 14 and 16 use the address information received from address and data interface 18 to select the respective word and row as indicated by the address information.

The output signals provided by section select unit 16 for selection of a memory section are fed in parallel to memory cell array 12 and to profile storage unit 20. Profile storage unit 20 comprises a set of access flags, one access flag for each possible row address. Therefore, each access flags governs the access to one row of the memory cell, and can be addressed using the same signaling as for the corresponding memory row of memory cell array 12. Profile storage unit 20 provides as an output signal the state of the selected access flag to access control unit 22.

For performance reasons, it is advantageous that the access flags are implemented as fast read-out state registers in the memory addressing. It is also advantageous to have the access flag states in a section of the non-volatile memory 12 and to copy the contents of the non-volatile registers into the fast registers.

The state of each individual access flag can be programmed through address and data interface 18. This way, different memory access characteristics can be given to different parts of the memory. For instance a ROM memory and a RAM memory can be implemented in the memory device 10 by defining on one hand the address range of the memory cell array 12 to which random access shall be granted, and on the other hand the address range of memory cell array 12 to which only read access shall be granted. It is easily seen that other parts of the memory may be in a similar way be provided with other access characteristics, as described above.

Access control unit 22 operates in the data path to admit or reject the flow of data to or from the memory, depending on the flag state signal it currently receives from profile storage unit 20.

This simple example shows how flexible the memory device can be adapted to a specific hardware or software environment. Obviously, there is no restriction in the selection mechanism to the matrix-like selection scheme described above. Any known cell selection technique can be used with this embodiment. It is only important that the incoming address is used to select a defined area of the memory and corresponding access flags. The selected access flag(s) control(s) whether the access is allowed or not. The access flags can be programmed through the address and data interface In an alternative embodiment that is not shown the block of access flags is part of the memory cell array 12. In a further alternative embodiment the access flag is selected through a special address input line.

Figure 2:
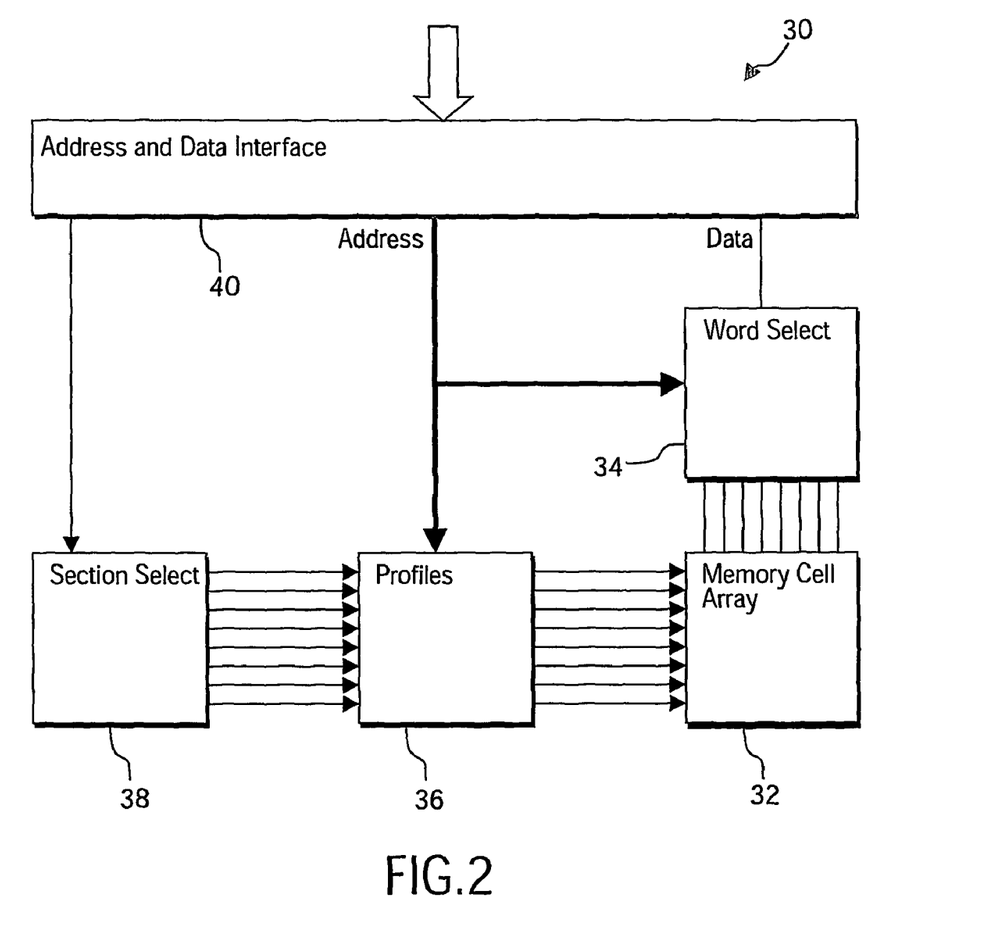
FIG. 2 is a simplified block diagram of a second embodiment of a memory device according to the invention.

FIG. 2 shows in a simplified block diagram as a second preferred embodiment a memory device 30 according to the invention. The memory device has a memory cell array 32 of magnetic RAM cells. The memory cell array 32 is connected to a word-select unit 34 and a combined access control and profile storage unit 36. Profile storage unit is connected to a section-select unit 38. Word-select unit 34 and section-select unit 38 are connected to an address and data interface 40. Address and data interface 40 is an interface of memory device 30 to external memory clients.

The embodiment of FIG. 2 differs from that of FIG. 1 in that access control and profile storage are integrated into one single unit 36. In this embodiment, the access flags operate directly on the section select of the memory cell array, denying access where needed.

The common feature of the embodiments of FIGS. 1 and 2 is an SRAM-type memory mapped interface. When a write protect flag is active for a particular section addressed by an access request to the memory, memory writes to that particular section will be ignored.

An extension of the word select mechanism to include the access flags would be easy to implement in the embodiments of FIGS. 1 and 2. This could correspond to a situation where the access flags are programmed as an extension of the corresponding section; the address lines for selecting the section are the same as those for selecting the corresponding access flag.

The embodiments of FIGS. 1 and 2 suggest that the section governed by an access flag is equal to a row-addressing unit in the memory array. Obviously, that is not necessarily the case. E.g., the access section of memory cell array 12 or 32, respectively, could be standardized to a particular size, while the row and column organization of the memory arrays is optimized for a certain performance or memory capacity.

Figure 3:
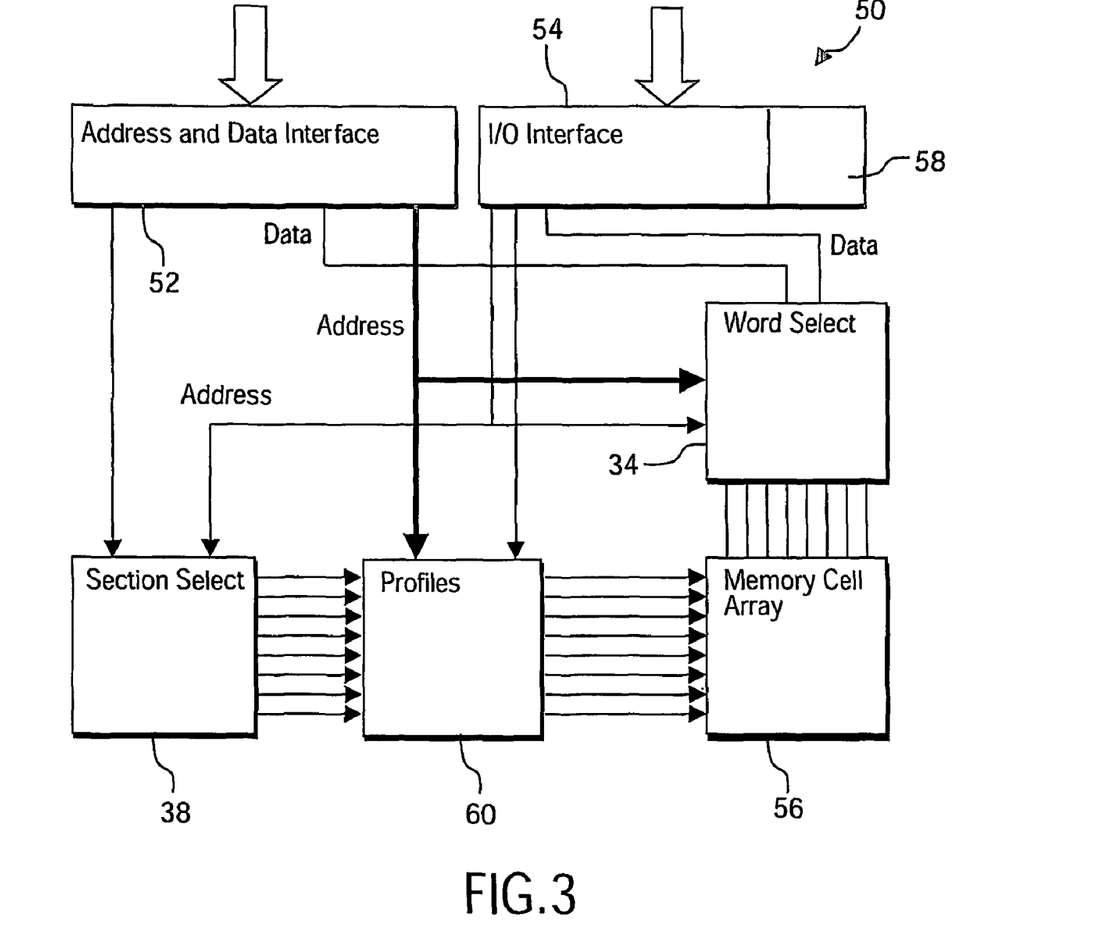
FIG. 3 is a simplified block diagram of a third embodiment of a memory device according to the invention.

The memory devices shown in FIGS. 1 and 2 can be extended to provide both an SRAM-type memory mapped interface and an I/O mapped interface. This extension is shown in FIG. 3 for a memory device 50, that otherwise resembles the embodiment of FIG. 2.

The following description concentrates on the differences to the embodiments of FIGS. 1 and 2. The memory device 50 has both an SRAM-type interface 52 and an I/O mapped interface 54. Both interfaces give access to the same memory cell array 56. An addressing register 58 of the I/O mapped interface 54 contains address bits. In addition, it also contains a special bit for selecting the profile storage unit 60, implemented in this embodiment in the form of a set of access protection registers and one or more bits to indicate different access IDs. For instance, two bits that can be used to indicate four different access IDs. Of course, any other number of bits can be used to indicate a lower or higher number of access IDs. Each access ID is allocated to one external memory client. The relation between an ID and a client can be enforced through computer hardware or software.

Each Byte of the access protection registers in profile storage unit 60 governs the access of a 4 KByte section of the memory 56. There are as many Bytes in the access protection registers of profile storage unit 60 as there are sections in the memory. In one access protection register byte there are 4 write protect flags and 4 read protect flags. Each flag governs the access for the corresponding access ID. Access through the SRAM interface 52 is controlled by the same bits as access through the I/O interface 54, for instance with access ID 00.

A write request that violates a write access flag is ignored, and a read request that violates a read access flag results in a fixed answer (e.g., all binary zeroes). Every access violation triggers an interrupt pin on the interface.

The memory device of the invention has been described by way of several embodiments. Even though the described embodiments focus on computer applications, the use of the present invention is not restricted to computers. Any digital system is within the scope of application of the memory device of the invention.

The memory device of the invention take the form of a memory component embedded in an integrated circuit, a separately packaged memory component on a systems board, or a separately packaged, removable peripheral memory product.

The invention claimed is:

1. A memory device comprising:
    an interface for receiving access requests, the interface having an address output to an address path and a data output to a data path, wherein address information is carried on the address path and data for writing to memory or data read from memory is carried on the data path;
    a memory cell array having a plurality of low-latency, rewritable, non-volatile memory cells forming at least one memory section;
    a word-select unit connected in the data path and to the address path and between the interface and the memory cell array to provide column selection;
    a section-select unit connected to the address path and between the interface and the memory cell array to provide row selection;
    wherein both the word-select unit and the section-select unit select a respective column and row of the memory cell array in response to the address information;
    a profile storage unit connected to said interface comprising a plurality of request profiles that each represent a profile of an access request, wherein each request profile includes:
        a set of request information elements, wherein at least one of the request information elements indicates whether an access request is a read request or a write request; and
        access flags, whose state indicates whether a corresponding access request is allowed to access the memory or not allowed to access the memory, the access flags comprising write protect flags and read protect flags;
    an access control unit connected to said profile storage unit and said memory and configured to allow or reject an access request;
    wherein said profile storage unit selects an access flag that corresponds to a request profile in response to an access request that fits the request profile; and
    wherein the access control unit allows or rejects an access request in response to the access flag that is selected by the profile storage unit and wherein a write request that violates a write access flag is ignored and a read request that violates a read access flag results in a fixed answer and wherein a violation triggers an interrupt pin on the interface.

2. The memory device of claim 1 wherein the profile storage unit comprises a set of access flags, one access flag for each row address, such that each access flag governs the access to one row of the memory cell array.

3. The memory device of claim 2 wherein the access flags are fast read-out state registers.

4. The memory device of claim 1 wherein the access control unit operates in the data path to admit or reject a flow of data to or from the memory cell array depending on the state of the corresponding access flag it receives from the profile storage unit.

5. The memory device of claim 1 further comprising a memory mapped interface and an I/O mapped interface connected to provide access to the memory cell array.

6. The memory device of claim 5 wherein pins of the memory device are shared by the memory mapped and I/O mapped interfaces.

* * * * *